US012565026B2

(12) United States Patent (10) Patent No.: US 12,565,026 B2

Mathy et al. (45) Date of Patent: Mar. 3, 2026

(54) FIRE RESISTANT VACUUM INSULATING GLAZING

(71) Applicants: AGC GLASS EUROPE, Louvain-la-Neuve (BE); AGC INC., Chiyoda Ku (JP); AGC FLAT GLASS NORTH AMERICA INC., Alpharetta, GA (US); AGC VIDROS DO BRASIL LTDA, Sao Paulo (BR)

(72) Inventors: Bertrand Mathy, Gosselies (BE); Thomas Lescot, Reves (BE); Pierre Schneider, Saint-Christophe-sur-le-Nais (FR); Julien Jeanfils, Walhain (BE)

(73) Assignees: AGC GLASS EUROPE, Louvain-la-Neuve (BE); AGC INC., Chiyoda-Ku (JP); AGC FLAT GLASS NORTH AMERICA INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 836 days.

(21) Appl. No.: 17/769,211

(22) PCT Filed: Oct. 2, 2020

(86) PCT No.: PCT/EP2020/077743

§ 371 (c)(1),
(2) Date: Apr. 14, 2022

(87) PCT Pub. No.: WO2021/073903

PCT Pub. Date: Apr. 22, 2021

(65) Prior Publication Data

US 2022/0402244 A1 Dec. 22, 2022

(30) Foreign Application Priority Data

Oct. 18, 2019 (EP) .................................... 19204179
May 14, 2020 (EP) .................................... 20174646

(51) Int. Cl.
*B32B 17/10* (2006.01)
*E06B 3/66* (2006.01)
(Continued)

(52) U.S. Cl.
CPC ................... *B32B 17/10311* (2013.01); *B32B 17/10055* (2013.01); *B32B 17/10174* (2013.01);
(Continued)

(58) Field of Classification Search
CPC ...... E06B 3/6612; E06B 3/66304; E06B 3/66; E06B 5/165; B32B 17/10311; B32B 17/069; B32B 17/10302
See application file for complete search history.

(56) References Cited

U.S. PATENT DOCUMENTS

2005/0008796 A1 1/2005 Kriltz et al.
2009/0148708 A1* 6/2009 Goelff ................... B32B 17/069
428/426
(Continued)

FOREIGN PATENT DOCUMENTS

CN 101725307 B 5/2012
DE 4319763 A1 12/1994
(Continued)

OTHER PUBLICATIONS

International Search Report issued Oct. 30, 2020 in PCT/EP2020/077743 filed Oct. 2, 2020, 2 pages.

*Primary Examiner* — Laura A Auer
(74) *Attorney, Agent, or Firm* — Oblon, McClelland, Maier & Neustadt, L.L.P.

(57) ABSTRACT

A fire resistant vacuum insulating glazing assembly includes at least one vacuum insulating glazing unit that has a first glass pane, GP1, which includes an inner pane face and an outer pane face and a second glass pane, GP2, which includes an inner pane face and an outer pane face. A set of (Continued)

discrete pillars is positioned between the first and second glass panes and maintains a distance between the first and the second glass panes. A hermetically bonding seal seals the distance between the first and second glass panes over a perimeter. An internal volume, V, is defined by the first and second glass panes and is closed by the hermetically bonding seal. There is a vacuum of absolute pressure of less than 0.1 mbar and the inner pane faces face the internal volume, V.

18 Claims, 4 Drawing Sheets

(51) Int. Cl.
    *E06B 5/16*             (2006.01)
    *E06B 3/663*          (2006.01)

(52) U.S. Cl.
    CPC .................. *B32B 17/10761* (2013.01); *B32B 17/10788* (2013.01); *E06B 3/6612* (2013.01); *E06B 5/165* (2013.01); *B32B 2307/3065* (2013.01); *B32B 2419/00* (2013.01); *E06B 3/66304* (2013.01); *E06B 3/66309* (2013.01)

(56)            References Cited

U.S. PATENT DOCUMENTS

2013/0196091 A1*   8/2013   Wildenhain  .......... B32B 17/069
                                          428/34
2013/0302542 A1*  11/2013   Jones  .................... E06B 3/6612
                                          428/34

FOREIGN PATENT DOCUMENTS

| | | | |
|---|---|---|---|
| EP | 2 308 675 | A1 | 4/2011 |
| EP | 3 527 365 | A1 | 8/2019 |
| WO | WO 03/039857 | A2 | 11/2002 |
| WO | WO 2008/084083 | A1 | 7/2008 |
| WO | WO 2018/024387 | A1 | 2/2018 |

* cited by examiner

FIRE RESISTANT VACUUM INSULATING GLAZING

1. FIELD OF THE INVENTION

The present invention relates to fire resistant glazings having improved thermal performance.

2. BACKGROUND OF THE INVENTION

Fire resistant glazings are well known in the art and are designed to meet well-defined specifications, including standards such as European standards EN 1363-1 and 1364-1 for walls, or 1634-1 for doors and windows. These characteristics are of course aimed at the properties of fire resistance, but further technical characteristics must be added to meet the requirements of the users and/or the modes of manufacture.

One way of constructing fire resistant glazing is to assemble several panes of glass separated by layers of intumescent materials. The weight and thickness of fire resistant glazings may become high depending on the fire resistance performances level required, that defines the number of glass panes and layers of intumescent material. The layers of intumescent material are most often composed of hydrated alkali metal silicates. Organic hydrogels may alternatively be used such as described for instance in WO2014190444. The intumescent materials under the effect of heat, expand by forming a foam opaque to radiation, that keeps the glass walls in position even when the latter are fragmented under the effect of heat.

The use of hydrated alkali metal silicates in the manufacture of fire resistant glazings is mainly carried out according to two distinct modes.

In the first mode known as the "drying process" the layer of intumescent material is obtained by applying solutions of these silicates over a glass pane and by carrying out a more or less prolonged drying step until a solid layer is obtained. Several assemblies layer/glass pane can be piled up to obtain products having the desired fire resistance performances. The last layer of silicate formed is covered by a final glass pane.

A second mode known as the "cast-in-place process" relates to products in which a silicate solution is modified by the addition of products qualified as "hardeners", "cross-linking agents" or in yet another way. These qualifications generally denote products which promote gelling of the silicate solution. They are chosen carefully so that, after their addition to the silicate solution, the latter, when left at rest, spontaneously hardens over a relatively short time, without being necessary to carry out a drying step.

For these products, before formation of the gel, the solution and its eventual additives, is poured in a cavity between two glass panes. The glass panes are joined at their periphery by a spacer which keeps them at a distance from each other, and which, with the two glass panes, defines a leaktight cavity in which the solution is poured. The fire resistant glazings obtained by this second mode comprise a peripheral spacer encompassing the intumescent layer.

In the products obtained by the first mode, the layer of intumescent material is devoid of an encompassing peripheral spacer over a perimeter thereof. In other words, the layer of intumescent material extends up to the edges of the glass panes. In contrast, the cast-in-place process implies the presence of such peripheral spacer and consequently the layer of intumescent material does not extend up to the edges of the glass panes.

Nowadays, in order to respond to the climate change, current market trend is to increase the thermal performance of buildings wherein glazing is an important part thereof. Hence, there is a need to design fire resistant glazings that demonstrate improved thermal performance.

One solution to increase the thermal performance of a fire resistant glazing is to include the fire resistant glazing into a double glazing system. However such systems raise several technical issues.

A first issue in designing a fire resistant glazing into a double glazing is that it increases even further the total thickness and the weight of the glazing. Therefore, it becomes even more difficult to handle and frame those glazing.

Moreover, the design of fire resistant double glazing requires by definition the use of a double glazing peripheral spacer. However, common double glazing peripheral spacers are not preferred in fire resistant applications which require specific spacers that resist properly to the fire conditions, such as stainless steel spacer. Such spacers do demonstrate poor thermal sealing and therefore substantially decrease the overall thermal performance of the window.

It has been found that designing fire resistant glazing into double glazing may not provide the necessary thermal protection to the layer of intumescent material, especially at high temperature where optical properties may be altered upon ageing.

Another issue is the sensitivity to humidity of hydrated alkali metal silicates. If the faces of the layers of intumescent material are protected by the glass panes, their edges must be protected to avoid the absorption of the atmosphere humidity and the alteration of the layer transparency. For fire resistant glazings obtained by the cast-in-place process, this protection is provided by the peripheral spacer encompassing the layer. In contrast, the fire resistant glazings obtained by the drying process are particularly sensitive to that technical issue. Thin aluminum strips are commonly used which protect the layers edges from contact with the atmosphere and make obstacle to the penetration of moisture. These adhesive strips have the disadvantage of being relatively fragile. They can be damaged during the handling of the glazing, during their storage or their subsequent use. When torn or partially torn off, they cannot adequately fulfill their role leading to a loss of protection of the layer of the intumescent material and the appearance of defects in time as a haze on the edges of the glazing. These defects are particularly troublesome when the fire resistant glazings have to be included into a double glazing system. Indeed the process to make a double glazing comprises a washing step in a washing machine during which the fire resistant glazing is in contact with a large amount of water. If the protecting strips are damaged, a part of the layer of intumescent material can dissolve in water leading to a deterioration of the layer at its edges and to the fouling of the washing machine.

On the other hand, vacuum insulating glazing unit (VIG) is a recent technology in the high insulating window market. Vacuum insulating glazing units are recommended because of their high-performance thermal insulation. A VIG unit is typically composed of at least two glass panes separated by an internal space in which a vacuum has been generated. In general, in order to achieve a high-performance thermal insulation (Thermal transmittance, U, being U<1.2 W/m2K) the absolute pressure inside the glazing unit is typically 0.1 mbar or less and generally at least one of the two glass panes is covered with a low-emissivity layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), discrete pillars are placed between the two glass panes.

However, there is still a need to provide a fire resistant glazing demonstrating highly superior thermal performance while avoiding the technical issues of double glazing.

3. SUMMARY OF THE INVENTION

Against this background we hereby provide a fire resistant vacuum insulating glazing assembly comprising:
  i. at least one vacuum insulating glazing unit comprising:
    a. a first glass pane, GP1, having an inner pane face and an outer pane face and a second glass pane, GP2, having an inner pane face and an outer pane face;
    b. a set of discrete pillars positioned between the first and second glass panes, maintaining a distance between the first and the second glass panes;
    c. a hermetically bonding seal sealing the distance between the first and second glass panes over a perimeter thereof;
    d. an internal volume, V, defined by the first and second glass panes and closed by the hermetically bonding seal; wherein there is a vacuum of absolute pressure of less than 0.1 mbar; and wherein the inner pane faces face the internal volume, V; and
  ii. at least one intumescent unit comprising:
    a layer of intumescent material;
    an intumescent unit glass pane, GPiu, in contact with the layer of intumescent material;
    wherein the layer of intumescent material is facing one of the outer pane faces of the first or second glass pane and is devoid of an encompassing peripheral spacer over a perimeter thereof.

The present invention further relates to a fire resistant vacuum insulating assembly wherein the layer of intumescent material is obtained by a process comprising the steps of:
    preparing an intumescent material precursors solution,
    applying the intumescent material precursors solution on a glass pane of the fire resistant vacuum insulating assembly positioned in a horizontal position,
    drying the intumescent material precursors solution to form the layer of intumescent material, having a first side in contact with said glass pane.

4. BRIEF DESCRIPTION OF THE DRAWINGS

4

Figure 4:
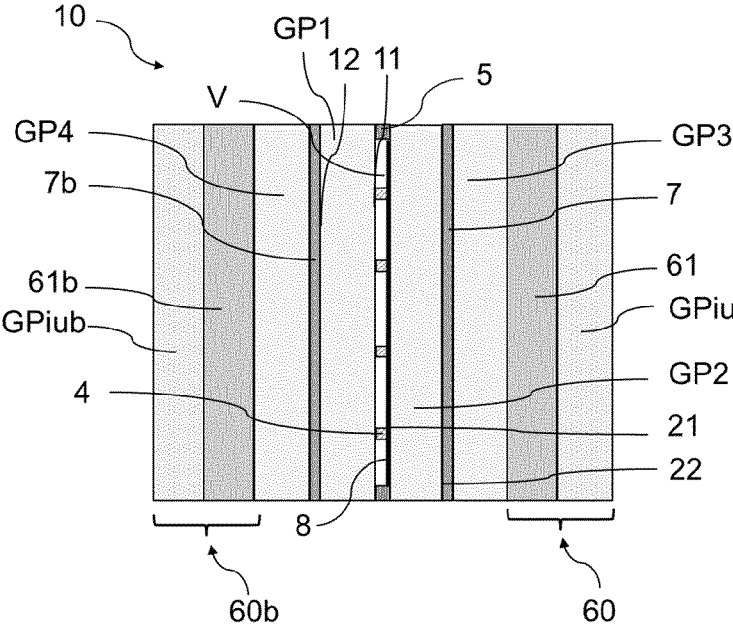

FIG. 4 shows a cross sectional view of a fire resistant vacuum insulating assembly according to one embodiment of the present invention, comprising one vacuum insulating glazing unit and two intumescent units, each added via an additional glass pane laminated to the vacuum insulating glazing unit.

Figure 5:
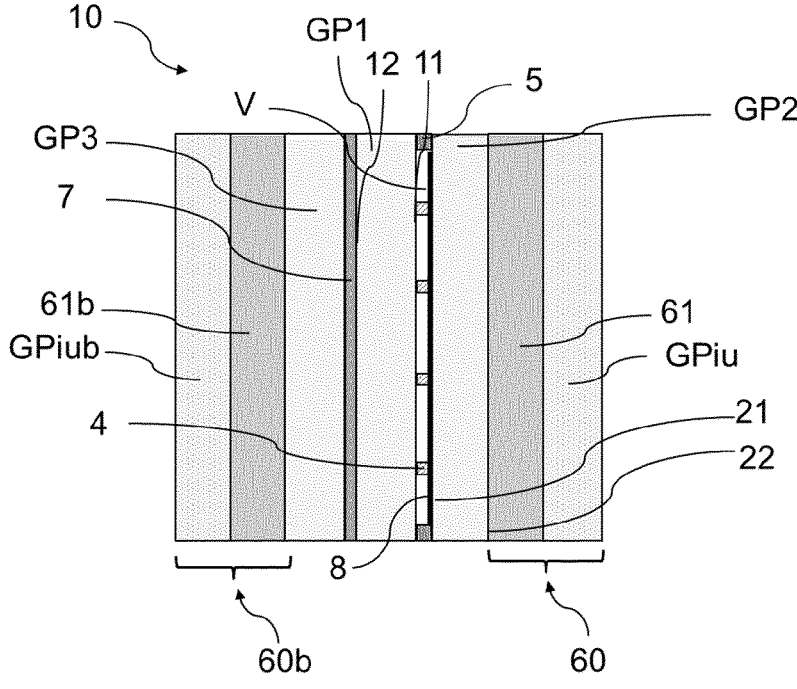

FIG. 5 shows a cross sectional view of a fire resistant vacuum insulating assembly according to one embodiment of the present invention, comprising one vacuum insulating glazing unit and two intumescent units, one intumescent unit added directly to the vacuum insulating glazing and one added via an additional glass pane laminated to the vacuum insulating glazing unit.

Figure 6:
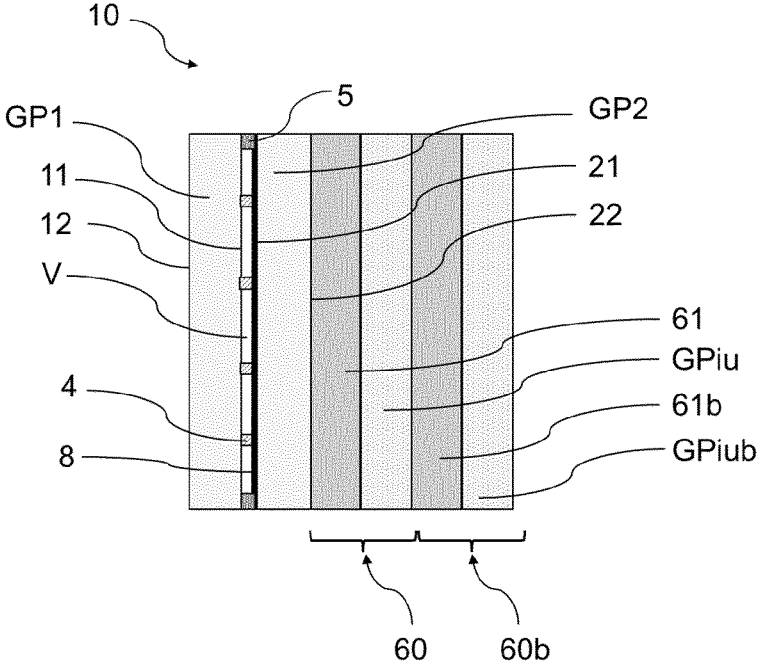

FIG. 6 shows a cross sectional view of a fire resistant vacuum insulating assembly according to one embodiment of the present invention, comprising one vacuum insulating glazing unit and two intumescent units, both added on the same side of the vacuum insulating unit.

Figure 7:
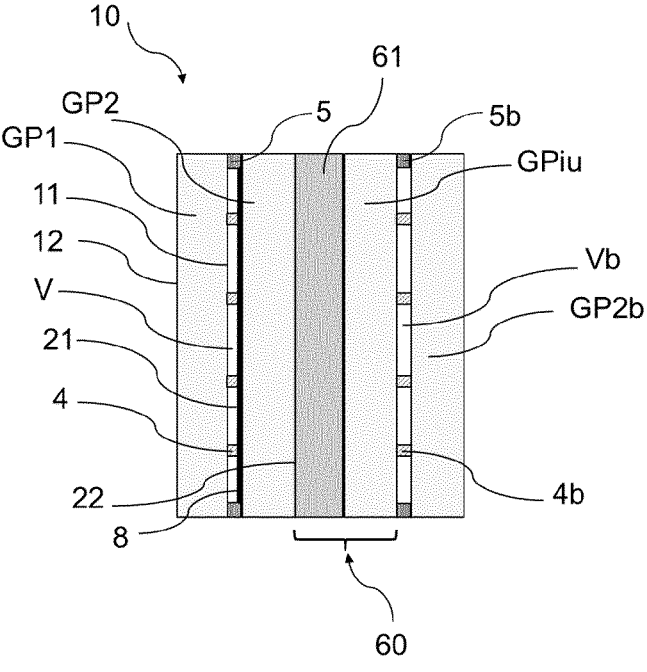

FIG. 7 shows a cross sectional view of a fire resistant vacuum insulating assembly according to one embodiment of the present invention, comprising two vacuum insulating glazing units encompassing a layer of intumescent material.

4. DETAILED DESCRIPTION OF THE INVENTION

The present invention relates to a "fire resistant vacuum insulating glazing assembly". Such object is hereinafter equally referred as a whole to "FR-VIG". It comprises a vacuum insulating glazing unit hereinafter equally referred to as "VIG" and one or more intumescent unit(s) hereinafter equally referred to as "IU".

The object of the invention is to provide a fire resistant glazing that demonstrates improved thermal performance, while minimizing its weight and thickness, is sustainable over time and can be produced in a cost effective manner; in particular, by avoiding the deterioration of the edges of the layer of intumescent material by contact with water during the production process.

It has been surprisingly found that the FR-VIG of the present invention demonstrates superior thermal performance while avoiding the technical drawbacks of the double glazing system or the negative impact of the washing step of the double glazing process. It provides an improved thermal protection of the layer of intumescent material especially at high temperature where optical properties are known to be prone to be altered upon ageing. It avoids the loss of thermal performance due to the poorly performing double glazing peripheral spacer, when metal spacers are used. It avoids the deterioration of the layer of intumescent material by avoiding the step of washing which is part of the process to make a double glazing. Moreover, thanks to the substantial thickness reduction of the FR-VIG, there is a substantial reduction of its weight and easier handling, a substantial reduction of the frame dimension; all providing substantial cost savings. Moreover, in some specific applications with very high fire resistance performance and/or high thermal performance, no compatible frame are currently existing. The present invention therefore provides a technical solution to such particular FR-VIGs. Furthermore, the width of the rabbet of the corresponding frame can be similarly reduced and therefore it improves retaining and preservation of the glazing assembly integrity when exposed to a fire hazard.

The glass panes suitable for the present invention can be of any type such as float glass panes or alternatively cast or drawn glass panes and can be chosen among all glass technologies such as: float clear, extra-clear or colored glass, (partially) acid etched or (partially) sand blasted glass and combinations thereof. The glass may be a soda-lime-silicate glass, an alumino-silicate glass, an alkali-free glass, a boro-silicate glass and the like. It may be a clear, extra-clear/low-iron or colored glass sheet. Preferably, the glass panes of the invention are made of a soda-lime glass or of an alumino-silicate glass. Non-limiting examples of glass panes are Planibel® Clear, Linea Azzura®, Dragontrail®, Tirex®, Falcon®, Clearvision®, Clearlite®.

The glass panes can be at least partially coated. By partially coated is meant that at least a part of at least one of their faces can be coated with any suitable coating depending on the needs such as for instance a low-emissivity coating, a solar control coating, an enamel or any combinations thereof. In the particular case where a coating would be in contact with the layer of intumescent material, suitable coatings are those being compatible with the layer of intumescent material, for instance compatible with the strongly alkaline character of hydrated alkali metal silicate compositions.

Thermally treated or chemically tempered glass panes can be used. The thermally treated glass pane can be treated by any thermal treatment known by the skilled person such as heat strengthening (according to EN 1863-1:2011), thermal toughening (according to EN 12150-2:2015) or thermal toughening and heat soaking (according to EN 14179-2:2005). The glass pane thermally treated according to these standards is suitable as safety glass. Chemical tempering is particularly suited for thin glass panes.

The fire resistant vacuum insulating glazing assembly of the invention comprises a vacuum insulating glazing unit, VIG, which comprises a first glass pane, GP1, and a second glass pane, GP2, that are spaced apart by way of a set of discrete pillars, a hermetically bonding seal and an internal volume. The set of discrete pillars holds said panes a certain distance apart. This distance is typically in the range of between 50 µm and 1000 µm, preferably between 50 µm and 500 µm and more preferably between 50 µm and 150 µm. Between said glass panes, an internal volume, V, wherein there is a vacuum of absolute pressure of less than 0.1 mbar, is closed with a hermetically bonding seal placed on the periphery of the glass panes around said internal space.

The first and the second glass panes have each an inner pane face and an outer pane face. Each inner pane face faces the internal volume, V. In one embodiment, the thickness of the first glass pane, Z1, is identical to the thickness of the second glass pane, Z2, (Z1=Z2). In another embodiment, the thickness of the first glass pane, Z1, is greater or lower than the thickness of the second glass pane, Z2 (Z1>Z2 or Z1<Z2). The thickness of the first and/or second glass panes, Z1, Z2, of the VIG unit, are typically equal to or greater than 2 mm (Z1, Z2 2 mm), preferably are equal to or greater than 3 mm, (Z1, Z2 3 mm), more preferably equal to or greater than 4 mm, (Z1, Z2 4 mm) more preferably equal to or greater than 6 mm, (Z1, Z2 6 mm). Typically, the thickness of the first and second glass panes, will be not more than 12 mm, preferably not more than 10 mm, more preferably not more than 8 mm.

The VIG of the present invention comprises a set of discrete pillars, sandwiched between GP1 and GP2 so as to maintain the internal volume, V. The discrete pillars are positioned between the GP1 and GP2, maintaining a distance between them and forming an array having a pitch, λ, comprised between 10 mm and 100 mm (10 mm≤λ≤100 mm). By pitch, it is meant the interval between the discrete spacers. In a preferred embodiment, the pitch is comprised between 20 mm and 80 mm (20 mm≤λ≤80 mm), more preferably between 20 mm and 50 mm (20 mm≤λ≤50 mm). The array is typically a regular array based on an equilateral triangular, square or hexagonal scheme, preferably based on a square scheme.

The discrete pillars can have different shapes, such as cylindrical, spherical, filiform, hourglass, C-shaped, cruciform, prismatic shape . . . It is preferred to use small pillars, i.e. pillars having in general a contact surface to the glass pane, defined by its external circumference, equal to or lower than 5 mm², preferably equal to or lower than 3 mm², more preferably equal to or lower than 1 mm². These values may offer a good mechanical resistance whilst being aesthetically discrete. The discrete spacers are typically made of a material having a strength endurable against pressure applied from the surfaces of the glass panes, capable of withstanding high-temperature process such as burning and baking, and hardly emitting gas after the glass pane is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

The internal volume, V, delimited between the glass panes of the VIG is closed with a hermetically bonding seal placed on the periphery of the glass panes around said internal volume. The said hermetically bonding seal is impermeable and hard. The term "impermeable" is herein understood to mean impermeable to air or any other gas present in the atmosphere.

Various hermetically bonding seal technologies exist. A first type of seal (the most widespread) is a seal based on a solder glass for which the melting point is lower than that of the glass of the glass panes of the glazing unit. The use of this type of seal limits the choice of low-E layers to those that are not degraded by the thermal cycle required to implement the solder glass, i.e. to those that are able to withstand a temperature possibly as high as 250° C.

A second type of seal comprises a metal seal, for example a metal strip of a small thickness (<500 µm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panes. There are various types of tie underlayers on the glass pane.

Patent application WO 2011/061208 A1 describes one example embodiment of a peripheral impermeable seal of the second type for a vacuum insulating glazing unit. In this embodiment, the seal is a metal strip, for example made of copper that is soldered by means of a solderable material to an adhesion band provided on the periphery of the glass panes.

A vacuum of absolute pressure less than 0.1 mbar, preferably less than 0.01 mbar is created, within the internal volume, V, defined GP1 and GP2 and closed by the hermetically bonding seal. Energy transfer through a VIG is greatly decreased by the vacuum. To generate the vacuum in the internal space of the glazing unit, a hollow glass tube bringing the internal space into communication with the exterior is generally provided on the main face of one of the glass panes. Thus, the partial vacuum is generated in the internal volume by pumping out gases present in the internal space by pumping out gases present in the internal space by virtue of a pump connected to the exterior end of the glass tube.

To maintain over time a given vacuum level in a VIG a getter may be used in the glazing unit. Specifically, the internal surfaces of the glass panes making up the glazing unit may release over time gases absorbed beforehand in the glass, thereby increasing the internal pressure in the vacuum insulating glazing pane and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing pane so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

The FR-VIG of the present invention further comprises at least one intumescent unit, IU, comprising a layer of intumescent material and an IU glass pane, GPiu.

By intumescent material is meant a material which will swell upon heating above a temperature of 100° C. The swelling is typically a consequence of the phase transition of the interstitial water from the liquid phase to the vapor phase within the intumescent material. The associated volume expansion of said water leads to the foaming of the gel. The thickness of the gel layer may thus increase by a factor ranging from two to a few dozen.

The GPiu is in contact with the layer of intumescent material. The layer of intumescent material is facing one of the outer pane faces of the first or second glass pane of the VIG. In other words, the layer of intumescent material does not face the exterior of the FR-VIG. The different glass panes of the FR-VIG are substantially parallel to each other's.

The layer of intumescent material is further devoid of an encompassing peripheral spacer over a perimeter thereof. In other words, the layer of intumescent material of the invention extends up to the edges of the GPiu. An intumescent unit devoid of a peripheral spacer encompassing the layer of intumescent material is typically obtained by the drying process that will be detailed later. On the contrary, an intumescent unit obtained by the cast-in-place process implies the presence of such peripheral spacer and consequently the layer of intumescent material does not extend up to the edges of the GPiu.

The layer of intumescent material may be a layer of hydrated alkali metal silicate composition. It may alternatively be a layer of organic hydrogel such as those described for instance in WO2014190444. Alternatively, the layer of intumescent material may also be a layer comprising both organic hydrogel and a hydrated alkali metal silicate composition, present in the form of a mixture or in the form of different sub-layers. By this last variant is meant that the layer of intumescent material may comprise at least one sub-layer of organic hydrogel and one sub-layer of hydrated alkali metal silicate composition.

In a preferred embodiment of the invention, the layer of intumescent material is a layer of hydrated alkali metal silicate composition. In comparison to organic hydrogels, the hydrated alkali metal silicates have a better thermal stability and better ageing resistance such as better resistance to yellowing. For instance, EP3395928A1 discloses the yellowing issue of organic hydrogels.

The layer of intumescent material suitable for the invention typically has a thickness ranging from 1 to 30 mm. Below 1 mm, the fire resistance performances are limited and above 30 mm the drying time to obtain the layer becomes too long. The thickness of a layer of organic hydrogel is more typically ranging from 5 to 30 mm. The thickness of a layer of hydrated alkali metal silicate composition more typically ranges from 1 to 10 mm, preferably from 1.2 to 6 mm.

The alkali metal silicates used in the hydrated alkali metal silicate compositions are generally chosen among potassium, sodium and lithium silicates. It is possible to have a mixture of these silicates in varying proportions. However, sodium silicates or potassium silicates or mixtures thereof are preferred.

The alkali metal silicates are generally characterized by a $SiO_2/M_2O$ molar ratio, which is the ratio between the number of moles of silica and the number of moles of alkali metal oxide present in the hydrated alkali metal silicate composition.

In the present embodiment, the molar ratio $SiO_2/M_2O$ preferably ranges from 2.5 to 8. It is more preferably at least 3, most preferably at least 3.2. More preferably it is at most 6, most preferably at most 5.3.

The choice of the amount of water content is a function not only of the fireproof properties, but also of the optical quality of the glazings obtained. For high water contents the layer of hydrated alkali metal silicate composition tends to be less stable on ageing. It is difficult to guarantee that these products remain perfectly transparent. It often forms a haze that becomes more pronounced over time.

For this reason, the water content of the layer of hydrated alkali metal silicate composition is typically ranging from 18 to 50 wt % on the total weight of the layer, preferably it is at most 45 wt %, most preferably at most 42 wt %.

Preferred layers of hydrated alkali metal silicate compositions are hydrated alkali metal silicate compositions comprising potassium and/or sodium silicates with a molar ratio $SiO_2/M_2O$ ranging from 2.5 to 8 and having a water content of 18 to 50 wt %.

In addition to the alkali metal silicates and water, various additives may be present in the hydrated alkali metal silicate composition such as polyols, and in particular ethylene glycol or glycerol. Polyols are intended to compensate the lack of plasticity of the hydrated alkali metal silicates. In return, the presence of polyols impacts negatively the drying speed of the composition so that their content must be carefully controlled. Polyols are generally present in the layer of hydrated alkali metal silicate composition at a concentration ranging from 0 to 22 wt %. Preferred levels of glycols are between 3 and 18 wt % of the layer of hydrated alkali metal silicate composition.

Traditionally, the layer of hydrated alkali metal silicate composition also comprises other additives in small proportions such as silicate stabilizing agents. These are for instance nitrogen products (urea, amines . . . ) which favor the development of regular foams, or surfactants which promote the wetting of the glass panes with which the layer of hydrated alkali metal silicate composition is in contact. Advantageously, the layer of hydrated alkali metal silicate composition contains tetra-methyl ammonium hydroxide (TMAH) at a content of at most 2 wt % on the weight of the layer.

To improve the adhesion of the layer of hydrated alkali metal silicate composition to the glass panes, adhesion promoters can be present, such as for example, silanes and functionalized silanes such as amino-silanes.

In a first particular embodiment of the invention, the layer of intumescent material of the FR-VIG is facing and is in contact with the outer pane face of the first (GP1) or second (GP2) glass pane.

In this embodiment, the layer of intumescent material is hence in contact with the outer pane face of GP1 or in contact with the outer pane face of GP2.

As used in the present invention, the wording "in contact with" does not preclude the presence of a coating such as those described supra (such as low-emissivity, solar control coating, enamel) or of an adhesion promoter on the surface of the glass pane, which are herein considered to be part of the glass pane.

Figure 1:
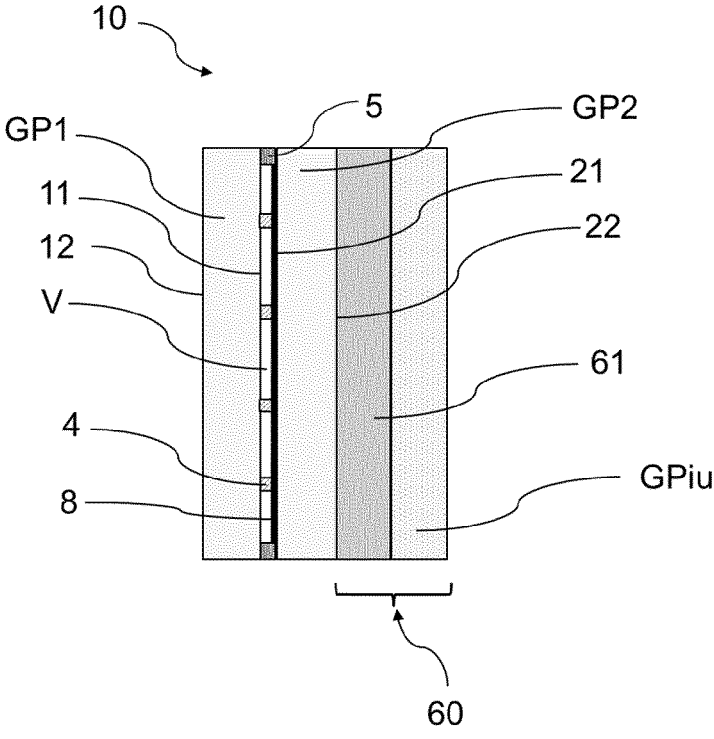
FIG. 1 shows a cross sectional view of a fire resistant vacuum insulating assembly according to one embodiment of the present invention, comprising one vacuum insulating glazing unit and one intumescent unit.

FIG. 1 provides an illustration of this embodiment wherein a FR-VIG (10) comprises a VIG and one IU (60). The VIG comprises a GP1 having an inner pane face (11) and an outer pane face (12) and a GP2 having an inner pane face (21) and an outer pane face (22). The inner pane face (21) of GP2 is provided with a coating (8). The VIG further comprises a set of discrete pillars (4) positioned between GP1 and GP2, maintaining a distance between them and a hermetically bonding seal (5) sealing the distance between GP1 and GP2 over a perimeter thereof. An internal volume, V, is defined by GP1 and GP2 and closed by the hermetically bonding seal (5). The inner pane faces (11, 21) face the internal volume, V. The intumescent unit (60) comprises a layer of intumescent material (61) that is in contact on one side with the outer pane face (22) of GP2 and on the other side, with the intumescent unit glass pane (GPiu). The layer of intumescent material (61) is devoid of an encompassing peripheral spacer over a perimeter thereof.

In a variant of this embodiment, the FR-VIG can further comprise at least a second intumescent unit wherein the layer of intumescent material of this second IU is facing and is in contact with the other outer pane face of GP1 or GP2. In this particular case, the outer pane face of each of GP1 and GP2 is in contact with an intumescent layer. In other words, the FR-VIG comprises an intumescent unit on each side of the VIG.

Figure 2:
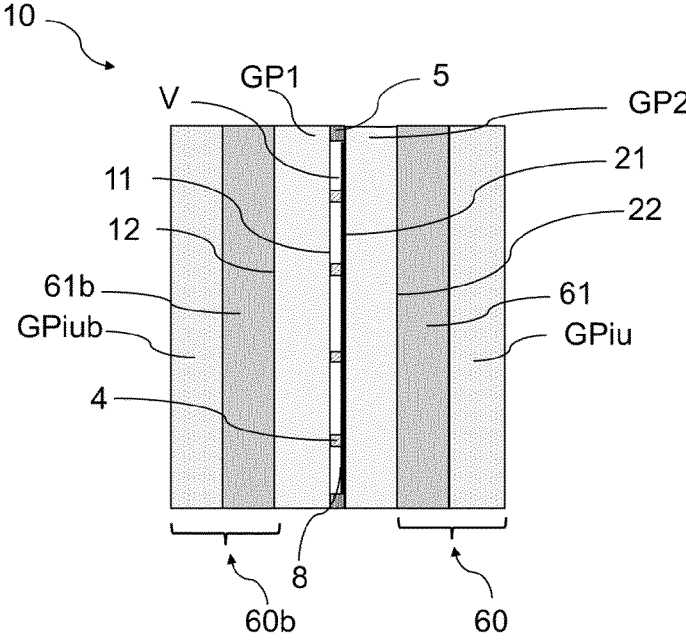
FIG. 2 shows a cross sectional view of a fire resistant vacuum insulating assembly according to a further embodiment of the present invention, comprising one vacuum insulating glazing unit and an intumescent unit on each side of the vacuum insulating glazing unit.

FIG. 2 provides an illustration of this variant wherein the FR-VIG (10) comprises a VIG and an IU (60) as already described with reference to FIG. 1. The FR-VIG further comprises another IU (60b) comprising a layer of intumescent material (61b) and an IU glass pane (GPiub), wherein the layer of intumescent material (61b) is in contact on one side, with the outer pane face (12) of GP1 and on the other side, with the intumescent unit glass pane (GPiub). The layer of intumescent material (61b) is devoid of an encompassing peripheral spacer over a perimeter thereof.

In a second particular embodiment of the invention, the layer of intumescent material is facing the outer pane face of the first (GP1) or second (GP2) glass pane and is separated therefrom by an additional glass pane, GP3, laminated by a polymer interlayer to said outer pane face. Contrarily to the previous embodiments, the layer of intumescent material is herein separated from the outer pane face of GP1 or GP2 by a polymer interlayer and GP3. This embodiment is of particular interest as such FR-VIG can for instance be produced in an easy way by lamination with a polymer interlayer of:

an existing VIG and
an existing fire-resistant glazing typically composed of 2 glass panes separated by a layer of intumescent material.

This construction allows to join an existing VIG component to an existing fire resistant glazing, optionally in a location which is the same or different from where the individual components are being processed.

The advantage of such construction includes the reaching of a higher class of safety glazing by the mechanical reinforcement of the glazing according to EN12600 (European Standard for Safety Glazing). A further advantage is the improved absorption of the mechanical stress between the components in case of warpage.

The polymer interlayer to be used in this embodiment typically comprises a material selected from the group consisting of ethylene vinyl acetate (EVA), polyisobutylene (PIB), polyacetals such as polyvinyl butyral (PVB), polyurethane (PU), polyvinyl chloride (PVC), polyesters, cyclo olefin polymers (COP), ionomers and/or an ultraviolet activated adhesives, and others known in the art of manufacturing glass laminates. Blended materials using any compatible combination of these materials can be suitable as well. Preferably, the polymer interlayer comprises a material selected from the group consisting of ethylene vinyl acetate and/or polyvinyl butyral. More preferably, the polymer interlayer comprises a material capable of being processed at lower pressure, such as ethylene vinyl acetate.

The polymer interlayer acts as a "bonding interlayer" since the polymer interlayer and the glass pane form a bond that results in adhesion between the glass pane and the polymer interlayer.

The polymer interlayer to be used in the present invention may be a transparent or translucent polymer interlayer. However, for decorative applications, the polymer interlayer may be colored or patterned.

Typical thicknesses for the polymer interlayer are 0.15 mm to 3.5 mm, preferably 0.30 mm to 1.75 mm, more preferably from 0.5 mm to 1.75 mm. Usual commercially available polymer films are polyvinyl butyral (PVB) layers of 0.38 mm and 0.76 mm, 1.52 mm, 2.28 m and 3.04 mm. To achieve the desired thickness, one or more of those films can be used.

Reinforced acoustic insulation can be provided by using a polymer interlayer with specific acoustic performance, such as specific PVBs, is used: e.g. Saflex® acoustic PVB interlayer from Eastman or Trosifol® acoustic PVB layer from Kuraray.

By appropriately selecting the polymer interlayer, UV protection of the intumescent material may also be provided.

If several polymer interlayers are present in the FR-VIG, they can be made of the same or different materials. For practical reasons, they preferably are made of the same material.

Figure 3:
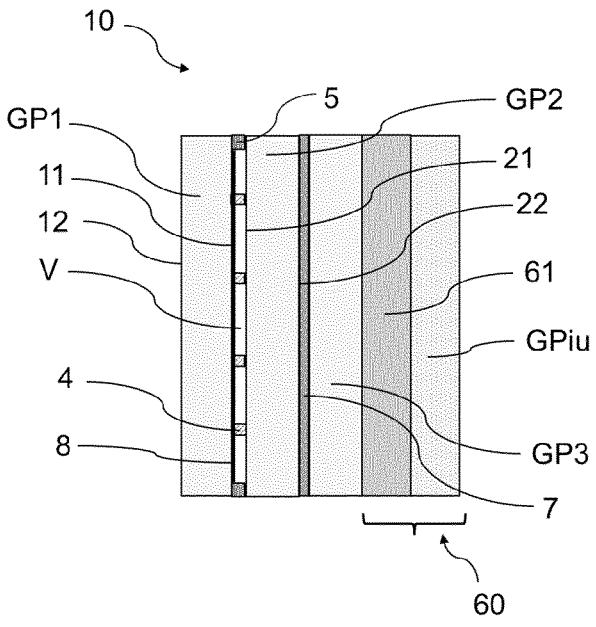
FIG. 3 shows a cross sectional view of a fire resistant vacuum insulating assembly according to one embodiment of the present invention, comprising one vacuum insulating glazing unit and one intumescent unit added via an additional glass pane laminated to the vacuum insulating glazing unit.

FIG. 3 provides an illustration of this embodiment wherein a FR-VIG (10) comprises a VIG and an IU (60) as already described with reference to FIG. 1, but here a coating (8) is provided on the inner pane face (11) of GP1. The FR-VIG of FIG. 3 further comprises an additional glass pane GP3 and a polymer interlayer (7). GP3 and the polymer interlayer (7) separate the VIG and the IU. The glass pane GP3 is on one side, laminated to the outer pane face (22) of GP2 and on the other side, is in contact with the intumescent layer (61).

In a variant of this second embodiment, the FR-VIG can further comprise at least a second intumescent unit wherein the layer of intumescent material is facing the other one of the outer pane faces of GP1 or GP2 and is separated therefrom by an additional glass pane, GP4, laminated by a polymer interlayer to said outer pane face. In other words, the FR-VIG comprises an intumescent unit on each side of the VIG.

FIG. 4 provides an illustration of this variant wherein the FR-VIG (10) comprises a VIG and an IU (60) as already described with reference to FIG. 1. In FIG. 4, the layer of intumescent material (61) is separated from the VIG by the glass pane GP3 and the polymer interlayer (7). In addition, the FR-VIG of FIG. 4 comprises another intumescent unit (60*b*) with a layer of intumescent material (61*b*) and an intumescent unit glass pane (GPiub), wherein the layer of intumescent material (61*b*) is facing the outer pane face (12) of GP1 and is separated therefrom by an additional glass pane, GP4, laminated by a polymer interlayer (7*b*) to said outer pane face. In other words, the FR-VIG comprises an intumescent unit on each side of the VIG.

A third particular embodiment of the invention is a combination of the two first embodiments wherein the VIG of the FR-VIG is surrounded by an intumescent unit on each side. On one side, one of GP1 or GP2 has its outer pane face in contact with the layer of intumescent material of the first intumescent unit and on the other side, the other one of GP1 or GP2 has its outer pane face separated from the layer of intumescent material of the second intumescent unit by a glass pane laminated by a polymer interlayer to said outer pane face.

FIG. 5 provides an illustration of this embodiment wherein the FR-VIG (10) comprises a VIG and two intumescent units (60,60*b*) as already described with reference to FIG. 2. The FR-VIG of FIG. 5 further comprises an additional glass pane GP3 and a polymer interlayer (7) that separate the intumescent unit (60*b*) from the outer pane face (12) of GP1.

In a fourth particular embodiment of the invention that is also applicable to the three preceding ones, the FR-VIG further comprises at least one additional intumescent unit wherein the intumescent layer of the additional intumescent unit is facing the IU glass pane of the preceding intumescent unit. The additional intumescent unit may be facing the IU glass pane of the preceding intumescent unit and be in contact with it, or it can be facing the IU glass pane of the preceding intumescent unit and be separated from it by an additional glass pane laminated by a polymer interlayer to said IU glass pane. The FR-VIG in this embodiment may also comprise several additional intumescent units. When the FR-VIG comprises several intumescent units, the anti-fire performances of the FR-VIG advantageously improve with an increasing number of intumescent units, however the thickness and the weight of the FR-VIG also increase and the right balance has to be achieved depending on the needs. In the present embodiment, the number of IU typically ranges from 2 to 15, preferably from 2 to 6.

FIG. 6 provides an illustration of this embodiment wherein a FR-VIG (10) comprises a VIG and an IU (60) as already described with reference to FIG. 1. The FR-VIG of FIG. 6 further comprises one additional intumescent unit (60*b*) wherein the layer of intumescent material (61*b*) is in contact with GPiu of the preceding intumescent unit.

In a fifth particular embodiment of the invention, the layer of intumescent material of the FR-VIG is facing and is in contact with one of the outer pane faces of the first (GP1) or second (GP2) glass pane and the FR-VIG further comprises:

i. another glass pane, GP2*b;* ii. another set of discrete pillars positioned between the intumescent unit glass pane, GPiu, and GP2*b*, maintaining a distance between GPiu and GP2*b;* iii. another hermetically bonding seal sealing the distance between GPiu and GP2*b* over a perimeter thereof;

iv. another internal volume, Vb, defined by GPiu and the other glass pane GP2*b* and closed by the other hermetically bonding seal and wherein there is an absolute vacuum of pressure of less than 0.1 mbar.

In this embodiment, a second VIG is hence formed comprising GP2*b*, the IU glass pane, the set of discrete pillars, the hermetically bonding seal and the internal volume. GPiu is at the same time a glass pane of the intumescent unit and of the second VIG.

The FR-VIG of this variant can for instance be obtained by joining two VIG's with a layer of intumescent material.

A FR-VIG according to this embodiment is illustrated in FIG. 7 wherein a FR-VIG (10) comprises a VIG and an IU (60) as already described with reference to FIG. 1. The FR-VIG of FIG. 7 further comprises an additional glass pane, GP2*b*, an additional set of discrete pillars (4*b*) between the IU glass pane GPiu and GP2*b*, an additional hermetically bonding seal (5*b*) and an additional internal volume, Vb, defined by GPiu and GP2*b* and closed by the bonding seal (5*b*). A second VIG is hence formed by GP2*b*, GPiu, the set of discrete pillars (4*b*), the hermetically bonding seal (5*b*) and the internal volume Vb. GPiu is at the same time a glass pane of the intumescent unit (60) and of the second VIG and the layer of intumescent material (61) is encompassed between the first and the second VIG's.

In the embodiments of the invention where the FR-VIG comprises several intumescent units, the layers of intumescent materials can be the same or different. A few non exhaustive examples of the use of different layers of intumescent materials are FR-VIG with layers of hydrated alkali metal silicates of different compositions, FR-VIG with layers of organic hydrogels of different compositions, FR-VIG with some layers of hydrated alkali metal silicates and some of organic hydrogels. When several intumescent units are present, the layers of intumescent materials preferably are all devoid of an encompassing peripheral spacer over a perimeter thereof. They are all preferably layers of hydrated alkali metal silicate compositions with the same or different compositions.

In the embodiments of the present invention where the FR-VIG comprises several intumescent units, all the intumescent units are preferably facing the same glass pane of the VIG. In other words, the VIG is not sandwiched between intumescent units.

This is of particular interest when the FR-VIG is used to close an opening within a partition. This partition separates an exterior space from an interior space, typically a partition separating the exterior atmosphere from the interior space of a building. Indeed, in this case, the intumescent unit(s) must be protected from the external environment and from high temperatures and hence the FR-VIG is preferably positioned such that the intumescent units are facing the interior space and the VIG is facing the exterior atmosphere. For the same reason, a FR-VIG comprising a single intumescent unit used to close an opening of partition separating the exterior atmosphere from the interior space of a building is preferably positioned with the intumescent unit facing the interior space and the VIG facing the exterior atmosphere.

The FR-VIG of the invention may also comprise at one or both extremities one or more additional glass panes laminated by polymer interlayer(s). Polymer interlayers have been described supra. This is particularly advantageous to improve safety performances such as anti-burglary and anti-bullet performances, protection against defenestration.

In a preferred embodiment of the present invention, the inner pane face of the first and/or second glass pane of at least one VIG is provided with a coating such as a heat ray reflection coating or a low-E coating. It is for instance illustrated by the coating (8) in FIGS. 1 and 2.

The number of intumescent units of the FR-VIG typically ranges from 1 to 15 and preferably from 1 to 6.

The layer of intumescent material devoid of a peripheral spacer may typically be obtained by the process comprising the steps of:

preparing an intumescent material precursors solution, applying the intumescent material precursors solution on a glass pane of the FR-VIG positioned in a horizontal position, drying the intumescent material precursors solution to form the layer of intumescent material having a first side in contact with said glass pane.

The step of preparing an intumescent material precursors solution may be performed by any method known to the skilled person. The precursors may for instance be introduced via flow meters into a mixing tank.

The intumescent material precursors solution may be a hydrated alkali metal silicate precursors solution or an organic hydrogel precursors solution or a solution comprising both hydrated alkali metal silicate precursors and organic hydrogel precursors. This process is particularly suitable for hydrated alkali metal silicate precursors solutions.

In the case of a hydrated alkali metal silicate precursors solution, the solution may for instance be prepared starting from commercial aqueous solutions of alkali metal silicates or from mixtures of colloidal silica added with alkali hydroxides or both of them.

The hydrated alkali metal silicates are those described supra. The mixtures of colloidal silica with alkali hydroxides may have a substantially lower water content than that of the industrial silicates and so a much higher $SiO_2/M_2O$ ratios. Their use may hence advantageously reduce the drying time and offer a better refractory behavior in case of fire. Nevertheless, for economic reasons, it is preferred to use industrial alkali metal silicates added with colloidal silica if solutions having high molar ratios are desired, without the need to eliminate an excessive quantity of water.

When mixtures of colloidal silica and alkali hydroxides are used, the properties of the intumescent material precursors solution depends on the particles size. In general, an increase of the particle size within certain limits makes it possible to delay the undesired caking of the solution before its application on a glass pane of the assembly. In other words, increasing the silica particle size allows to maintain the required viscosity of the intumescent material precursors solution for further processing.

Obviously, the increase in particle size is limited since beyond a certain dimension, the mixtures no longer exhibit the required optical properties, and in particular transparency. Too large dimensions of the silica particles lead to a diffusion of light, and to the formation of a haze. In practice, the silica particles used for the formation of the silicate based intumescent material mixture have an average diameter of not less than 40 nm and preferably not less than 50 nm. These particles also have average dimensions which do not exceed advantageously 150 nm and preferably not 130 nm. The particularly preferred average diameter is between 60 nm and 120 nm.

The molar ratio $SiO_2/M_2O$ of the hydrated alkali metal silicate precursors solution is also as described supra for the layer of hydrated alkali metal silicate composition.

The water content of the hydrated alkali metal silicate precursors solution typically ranges from 40 to 65 wt % on the weight of the solution.

Polyols are generally added in the hydrated alkali metal silicate precursors solutions at a concentration not greater than 15 wt %, preferably not greater than 10 wt % on the weight of the solution. Preferred polyols are glycols, especially ethylene glycol or glycerin.

Traditionally, the hydrated alkali metal silicate precursors solution also comprises other additives in small proportions such as nitrogen products (urea, amines . . . ), surfactants or adhesion promoters such as silanes and functionalized silanes such as amino-silanes as described supra in connection with the hydrated alkali metal silicates composition. Advantageously, the precursors solution contains tetramethyl ammonium hydroxide (TMAH) at a content of at most 1.5 wt % on the weight of the solution.

An optional step of dehydration of the intumescent material precursors solution may take place between the step of preparing the solution and the step of applying the solution on a glass pane of the assembly in order to reduce the amount of water of the solution. This dehydration step is different from the drying step that will occur after the application of the solution on the horizontal glass pane.

The solution after the dehydration, is sufficiently stable at ordinary ambient temperature conditions. It can be stored for several hours, or even days if necessary by cooling, without the risk of formation of a gel. It is possible to use this stability to eliminate bubbles that may have appeared during the preparation of the solution.

In a subsequent step, the intumescent material precursors solution is applied on a glass pane of the assembly placed in horizontal position.

The step of drying the intumescent material precursors solution is generally performed by introducing the glass pane provided with the intumescent material precursors solution in a heated chamber under controlled conditions of temperature and humidity. The drying time may vary depending on the drying conditions, it generally ranges from a few hours to 48h. The drying time is not only expensive but it also influences the quality of the products obtained. At temperatures of the order of one hundred ° C., prolonged contact of the glass sheets and strongly alkaline compositions can lead to a surface attack of the glass. The drying may also be done by placing the coated glass pane on a conveyer moving in an oven such as a heated tunnel. The drying is performed until a layer of intumescent material is formed that has its first side in contact with said glass pane of the assembly.

In a particular embodiment, the layer of intumescent material may be composed of several sub-layers obtained from intumescent material precursors solutions that may be the same or different. A few non exhaustive examples of a layer of intumescent material composed of sub-layers that are different are a layer composed of:

sub-layers of hydrated alkali metal silicates of different compositions, sub-layers of organic hydrogels of different compositions, sub-layer(s) of hydrated alkali metal silicates and sub-layer(s) of organic hydrogels.

The first sub-layer is formed on one glass pane of the assembly, the following one(s) are successively formed on the preceding one.

The person skilled in the art realizes that the present invention by no means is limited to the embodiments or Figures described above. On the contrary, many modifications and variations are possible within the scope of the appended claims. It is further noted that the invention relates to all possible combinations of features, and preferred features, described herein and recited in the claims. The Figures are not drawn to scale and are presented in an illustrative goal only.

NUMERAL REFERENCES

| Ref. # | Feature |
|---|---|
| 10 | fire resistant vacuum insulating glazing assembly |
| 11 | inner pane face of the first glass pane |
| 12 | outer pane face of the first glass pane |
| 21 | inner pane face of the second glass pane |
| 22 | outer pane face of the second glass pane |
| 4, 4b | Discrete pillar |
| 5, 5b | Hermetically bonding seal |
| 60, 60b | Intumescent unit |
| 61, 61b | Layer of intumescent material |
| 7, 7b | Polymer interlayer |
| 8 | Heat ray reflection film or Low emissivity film |
| GP1 | First glass pane |
| GP2, GP2b | Second glass pane |
| GP3, GP4 | Additional glass pane |
| GPiu, GPiub, | Intumescent unit glass pane |
| V, Vb | Internal volume |

The invention claimed is:

1. A fire resistant vacuum insulating glazing assembly comprising:
   i. At least one vacuum insulating glazing unit comprising:
      a. a first glass pane, GP1, having an inner pane face and an outer pane face and a second glass pane, GP2, having an inner pane face and an outer pane face;
      b. a set of discrete pillars positioned between the first and the second glass panes, maintaining a distance between the first and the second glass panes;
      c. a hermetically bonding seal sealing the distance between the first and the second glass panes over a perimeter thereof;
      d. an internal volume, V, defined by the first and the second glass panes and closed by the hermetically bonding seal; wherein there is a vacuum of absolute pressure of less than 0.1 mbar; and wherein the inner pane faces of the first and the second glass panes (GP1, GP2) face the internal volume, V; and
   ii. at least one intumescent unit comprising:
      a layer of intumescent material;
      an intumescent unit glass pane, GPiu, in contact with the layer of intumescent material;
      wherein the layer of intumescent material is facing one of the outer pane faces of the first or the second glass pane (GP1, GP2) and is devoid of an encompassing intumescent unit peripheral spacer over a perimeter thereof.

2. The fire resistant vacuum insulating assembly according to claim 1, wherein the layer of intumescent material is in contact with at least one of the outer pane faces of the first and second glass panes (GP1, GP2).

3. The fire resistant vacuum insulating assembly according to claim 1, wherein the layer of intumescent material is separated from at least one of the outer pane faces of the first and second glass panes (GP1, GP2) by an additional glass pane, GP3, laminated by a polymer interlayer to at least one of the outer pane faces of the first and second glass panes (GP1, GP2).

4. The fire resistant vacuum insulating assembly according to claim 3, wherein the polymer interlayer comprises a material selected from a group consisting of ethylene vinyl acetate (EVA), polyisobutylene (PIB), and polyacetals.

5. The fire resistant vacuum insulating assembly according to claim 2, further comprising:
      a. an additional glass pane, GP2b;

b. an additional set of discrete pillars positioned between the intumescent unit glass pane, GPiu, and the additional glass pane, GP2b, and maintaining a distance between them;
      c. an additional hermetically bonding seal sealing the distance between the intumescent unit glass pane and the additional glass pane, GP2b, over a perimeter thereof; and
      d. an additional internal volume, Vb, defined by the intumescent unit glass pane and the additional glass pane, GP2b, and closed by the additional hermetically bonding seal and wherein there is an absolute vacuum of pressure of less than 0.1 mbar.

6. The fire resistant vacuum insulating assembly according to claim 1, wherein the layer of intumescent material is selected from a group consisting of
      a layer of hydrated alkali metal silicate composition,
      a layer of organic hydrogel, and
      a layer comprising a hydrated alkali metal silicate composition and organic hydrogel, present in a form of a mixture or in a form of different sub-layers.

7. The fire resistant vacuum insulating assembly according to claim 6, wherein the layer of intumescent material is the layer of hydrated alkali metal silicate composition.

8. The fire resistant vacuum insulating assembly according to claim 7, wherein the layer of intumescent material has a water content from 18 to 50 wt % of the layer of intumescent material.

9. The fire resistant vacuum insulating assembly according to claim 7, wherein the layer of intumescent material has a $SiO_2/M_2O$ molar ratio from 2.5 to 8.

10. The fire resistant vacuum insulating assembly according to claim 7, wherein the layer of intumescent material further comprises polyols at a concentration ranging from 0 to 22 wt % of the layer of intumescent material.

11. The fire resistant vacuum insulating assembly according to claim 7, wherein the layer of intumescent material further comprises at least one silicate stabilizing agent.

12. The fire resistant vacuum insulating assembly according to claim 7, wherein the layer of intumescent material has a thickness ranging from 1 to 10 mm.

13. The fire resistant vacuum insulating assembly according to claim 1, wherein the layer of intumescent material is obtained by a process comprising:
      preparing an intumescent material precursors solution,
      applying the intumescent material precursors solution on a glass pane of the fire resistant vacuum insulating assembly positioned in a horizontal position, and
      drying the intumescent material precursors solution to form the layer of intumescent material, having a first side in contact with the glass pane.

14. The fire resistant vacuum insulating assembly according to claim 13, wherein the process to obtain the layer of intumescent material further comprises partially dehydrating between preparing the solution and applying the solution on the glass pane of the fire resistant vacuum insulating assembly.

15. The fire resistant vacuum insulating assembly according to claim 4, wherein the polymer interlayer comprises polyacetals selected from a group consisting of polyvinyl butyral (PVB), polyurethane (PU), polyvinyl chloride (PVC), polyesters, cyclo olefin polymers (COP), ionomers and/or an ultraviolet activated adhesives.

16. The fire resistant vacuum insulating assembly according to claim 3, wherein the polymer interlayer has a thickness of 0.38 or 0.76 mm.

17. The fire resistant vacuum insulating assembly according to claim 3, wherein the polymer interlayer is separate from the intumescent unit.

18. The fire resistant vacuum insulating assembly according to claim 3, wherein the polymer interlayer has a composition different from the intumescent material.

* * * * *